United States Patent
Pfau et al.

(10) Patent No.: US 8,310,350 B2
(45) Date of Patent: *Nov. 13, 2012

(54) MOUNTING APPARATUS FOR A HAPTIC SURFACE

(75) Inventors: Douglas Allen Pfau, Canton, MI (US); David Michael Whitton, Saline, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 466 days.

This patent is subject to a terminal disclaimer.

(21) Appl. No.: 12/569,110

(22) Filed: Sep. 29, 2009

(65) Prior Publication Data

US 2011/0074559 A1    Mar. 31, 2011

(51) Int. Cl.
*H04B 3/36* (2006.01)

(52) U.S. Cl. ............... 340/407.1; 340/407.2; 340/425.5; 340/12.54; 340/12.55; 340/13.24; 340/13.31; 345/156; 345/168; 345/173; 345/175; 345/179; 345/184

(58) Field of Classification Search ............... 340/407.1, 340/407.2, 425.5, 12.54, 12.55, 13.24, 13.31 345/156, 168, 173, 175, 179, 184
See application file for complete search history.

(56) References Cited

U.S. PATENT DOCUMENTS

| | | | |
|---|---|---|---|
| 6,693,626 B1 | 2/2004 | Rosenberg | |
| 6,697,044 B2 | 2/2004 | Shahoian et al. | |
| 6,961,644 B2 | 11/2005 | Mercier et al. | |
| 7,106,305 B2 | 9/2006 | Rosenberg | |
| 7,205,978 B2 | 4/2007 | Poupyrev et al. | |
| 7,324,094 B2 | 1/2008 | Moilanen et al. | |
| 7,336,266 B2 | 2/2008 | Hayward et al. | |
| 7,339,574 B2 | 3/2008 | Kyung et al. | |
| 7,356,448 B2 | 4/2008 | Schaeffer | |
| 7,616,192 B2 * | 11/2009 | Schroeder | 345/173 |
| 2003/0174121 A1 | 9/2003 | Poupyrev et al. | |
| 2004/0117084 A1 | 6/2004 | Mercier et al. | |
| 2005/0128186 A1 | 6/2005 | Shahoian et al. | |
| 2005/0156877 A1 | 7/2005 | Schaeffer | |
| 2005/0204312 A1 | 9/2005 | Rosel | |
| 2005/0230594 A1 | 10/2005 | Sato et al. | |
| 2005/0259076 A1 | 11/2005 | Hayasaka et al. | |
| 2006/0015560 A1 | 1/2006 | MacAuley et al. | |
| 2006/0025220 A1 | 2/2006 | Macauley et al. | |
| 2007/0040815 A1 * | 2/2007 | Rosenberg et al. | 345/173 |
| 2007/0146316 A1 | 6/2007 | Poupyrev et al. | |
| 2007/0152974 A1 | 7/2007 | Kim et al. | |
| 2007/0243835 A1 | 10/2007 | Zhu et al. | |
| 2008/0018592 A1 | 1/2008 | Park | |
| 2008/0084384 A1 | 4/2008 | Gregorio et al. | |
| 2008/0100568 A1 * | 5/2008 | Koch et al. | 345/156 |
| 2009/0174672 A1 * | 7/2009 | Schmidt | 345/173 |
| 2010/0090814 A1 * | 4/2010 | Cybart et al. | 340/407.2 |

FOREIGN PATENT DOCUMENTS

| | | |
|---|---|---|
| DE | 20180024 U1 | 11/2001 |
| DE | 20200904561 U1 | 6/2009 |
| WO | 2006045209 A2 | 5/2006 |

* cited by examiner

*Primary Examiner* — Tai T Nguyen
(74) *Attorney, Agent, or Firm* — Dickinson Wright PLLC

(57) ABSTRACT

A haptic system including a compliant member which limits the direction of motion of an interface surface providing haptic feedback to motion along a single axis. The compliant member allows for easy assembly, reduced ports, lighter weight and improved longevity and performance. The compliant member typically has a longitudinal extent that is greater than its lateral extent and height, and its height is greater than its lateral extent.

20 Claims, 2 Drawing Sheets

MOUNTING APPARATUS FOR A HAPTIC SURFACE

BACKGROUND OF THE INVENTION

1. Technical Field

The present invention is directed to a robust and compact haptic feedback system, more specifically, a haptic system that economically and reliably constrains movement of the interface surface to a single axis of motion to minimize potential for damage to a haptic feedback driver and more specifically, to a compliant mounting apparatus or member for haptic feedback systems that is capable of constraining motion of a haptic interface or interface surface in a single axis of movement.

2. Discussion

To improve and enhance ability to interface with various electronic devices, many manufacturers have added haptic feedback systems to various devices. In general, haptic feedback systems interface with a user via the sense of touch by applying forces, vibrations, and/or motions to the user. While haptic feedback devices can be used in a variety of devices, one particular area where haptic feedback is useful is touch screen interfaces or compact mechanical button interfaces, where the ability to visually interact is limited or reduced, such as for operators of vehicles, or smaller devices where size is a concern, such as inputs for cell phones and other portable electronic device. More specifically, haptic feedback systems are very helpful in providing the user with feedback without visual confirmation by the user, especially where the input member is too small to easily see, such as a touch screen keypad on a mobile phone. This haptic feedback is very useful in situations where the ability of the user to visually confirm actions may be constrained such as an operator of a vehicle attempting to provide input to or change settings on the vehicle, such as to climate control systems, GPS systems, and entertainment systems. More specifically, in motor vehicles, to minimize distraction during operation of the vehicle, haptic feedback systems provide the user with a touch feedback allowing the user to confirm that the desired input was properly entered and received by the vehicle while allowing the user to stay visually focused where needed during operation of the vehicle.

One type of haptic effect can be generated from a haptic effect driver that is a linear actuator. One problem with haptic effect drivers in particular haptic systems that have panel style input surfaces actuated in a single degree of freedom is that the haptic feedback driver providing the haptic motion to the haptic or interface surface may be damaged when forces are applied in directions other than along the axis of the haptic feedback motion. As interface surfaces have increased in size, such as large touch screen displays, and particularly, those haptic feedback systems integrated into moving vehicles, the potential for off-axis forces being applied to the haptic feedback driver has increased. There are also many areas in a vehicle that may be subject to impact or contact due to shifting loads, operator movements or passenger movements in getting in and out of the vehicle. In summary, the concern is that any applied off-axis force may damage the haptic feedback driver and prevent it from operating properly.

To address off-axis forces, some manufacturers have attempted to constrain motion of the interface surface through slides or other devices. These devices tend to be heavy, increase the friction and thereby the force required to move the interface surface as well as, in some instances, is susceptible to reduced operational performance due to dust or other contaminants over time. Any increase in required force to move the haptic surface or interface surface requires a more robust and larger haptic feedback driver which increases the cost of the system. In addition, most attempts to constrain motion of the interface surface results in additional material costs and additional assembly costs. Furthermore, it is important that the haptic feedback surface is not affected by environmental contaminants such as dirt, dust or even sticky solutions such as soda or juice being spilled on it as commonly can happen with many devices. The effect of environmental contaminants in these haptic systems is that the longevity of the haptic feedback driver or the ability of the haptic feedback driver to provide sufficient haptic motion to interface surface may be reduced or eliminated, primarily due to failure of the devices used to constrain motion.

In addition, the assembly and attachment of a haptic surface to a base is complex and the system allowing haptic motion is expensive and bulky. They also can be difficult to assemble.

Therefore, a need exists for a simple, easy to assembly, lightweight, low-cost, robust, and reliable haptic feedback system capable of constraining movement of an interface surface to movement that is substantially aligned to the axis of movement of the haptic feedback driver.

SUMMARY OF THE INVENTION

The present invention is directed to a robust and compact haptic feedback system, more specifically, a haptic system that economically and reliably constrains movement of the interface surface to a single axis of motion to minimize potential for damage to a haptic feedback driver and more specifically, to a compliant mounting apparatus or member for haptic feedback systems that is capable of constraining motion of a haptic interface or interface surface in a single axis of movement.

The present invention uses a series of beams or compliant members that extend between the interface surface and the base or the mounting surface of the haptics drive assembly. These compliant members generally fill two requirements. The first requirement is to attach the rear haptics assembly to the class-A interface surface, giving the class-A surface rigidity to keep it from being damaged during operation and typical use and abuse. The second function is to generally limit movement in a single degree of freedom so that haptic drivers can easily create a displacement on the class-A interface surface giving the user touching the surface acknowledgement that function has been actuated.

BRIEF DESCRIPTION OF THE DRAWINGS

The present invention will become more fully understood from the detailed description given here below, the appended claims, and the accompanying drawings in which:

DETAILED DESCRIPTION OF THE PREFERRED EMBODIMENT

Figure 1:
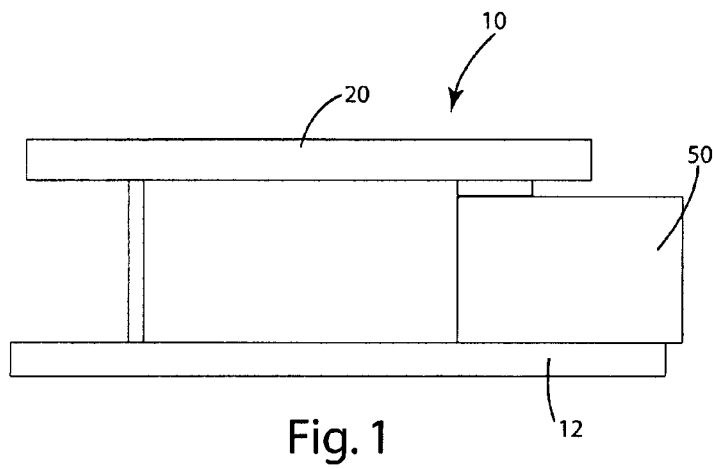
FIG. 1 is a schematic side view of an exemplary haptic system.

The present invention is directed to a haptic feedback system such as the exemplary haptic system 10 illustrated in FIG.

1. The haptic system 10 may be generally formed in any size, shape, or configuration and implemented in any desired device or any configuration within a device. The haptic system 10 is particularly applicable to devices having large input areas or interfaces. The haptic system 10 generally includes a rigid base 12 coupled to an interface surface or haptic surface 20 with a compliant member 30 therebetween. The compliant member 30 is configured to have significantly more flexibility along a single axis to provide desired haptic feedback through a flexibility difference due to a thin wall configuration in the direction of haptic motion. A haptic feedback driver 50 moves the interface surface 20 relative to the rigid base 12 thereby providing haptic feedback along a single axis of movement and the compliant member 30 constrains applied forces and movement of the interface surface to the single axis of movement.

Figure 2:
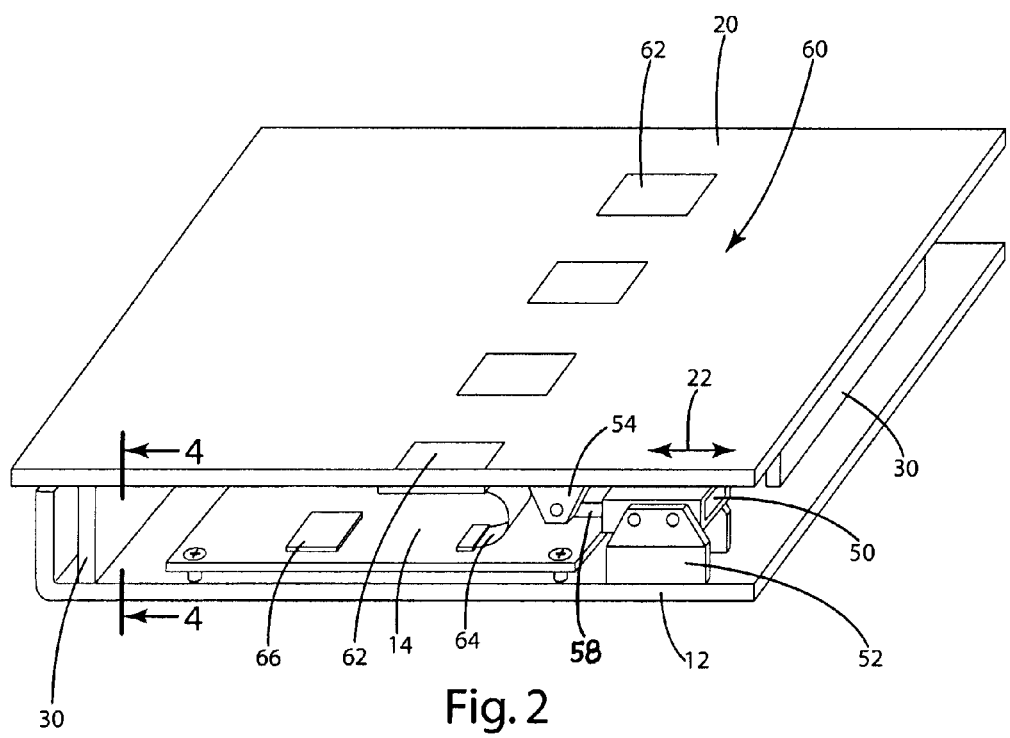
FIG. 2 is a perspective view of an exemplary haptic system.

Depending on the desired functions, types of interfaces and configurations, as well as the type of device in which the haptic feedback system is incorporated, the size, shape, style, and configuration of the haptic feedback system 10 may vary widely. The rigid base 12 may vary in size, shape, and configuration and depend on the type of device in which the haptic feedback system 10 is incorporated. For example, the rigid base 12 may be formed separately as illustrated in FIG. 2 or be formed as part of the frame or housing of the device (not illustrated). Similarly, the circuit boards 14 may have any desired size, shape, and configuration and instead of the single circuit board shown in FIG. 1 may include multiple circuit boards, or in some embodiments, the related circuit boards may be located remotely from the interface surface 20.

The haptic feedback driver 50 is coupled to the rigid base 12, or another fixed object, and haptic feedback driver 50 may be selected from a variety of devices capable of providing feedback. The driver 50 is generally illustrated in FIG. 2 as a solenoid. As further illustrated in FIG. 2, the haptic feedback driver 50 includes an exemplary rigid attachment 52 which attaches the driver 50 to the base 12. As further illustrated in FIG. 2, a shaft 58 extends from the driver 50 to be coupled to or attached to an interface attachment 54 which is connected or coupled to the interface surface 20. Of course, any known method of connecting the haptic feedback driver between the base 12 and interface surface 20 such as to move the interface surface 20 along an axis of motion relative to the base 12 may be used.

The interface surface 20 may be formed in a variety of styles and configurations. The interface surface 20 as illustrated in FIG. 2 as input surface having touch screen (or surface) interface 60. The touch screen interface 60 may include a variety of configurations, displays, and configurable options as desired. Of course, the touch screen interface 60 may also include touch screen buttons 62 such as virtual buttons that are shown on the screen that when touched haptic feedback movement of the interface surface 60 is provided. The touch screen interface 60 may also be connected with the circuit board 14 and various other controllers or processors 66 via the flex circuit 64 as illustrated in FIG. 2.

Figure 3:
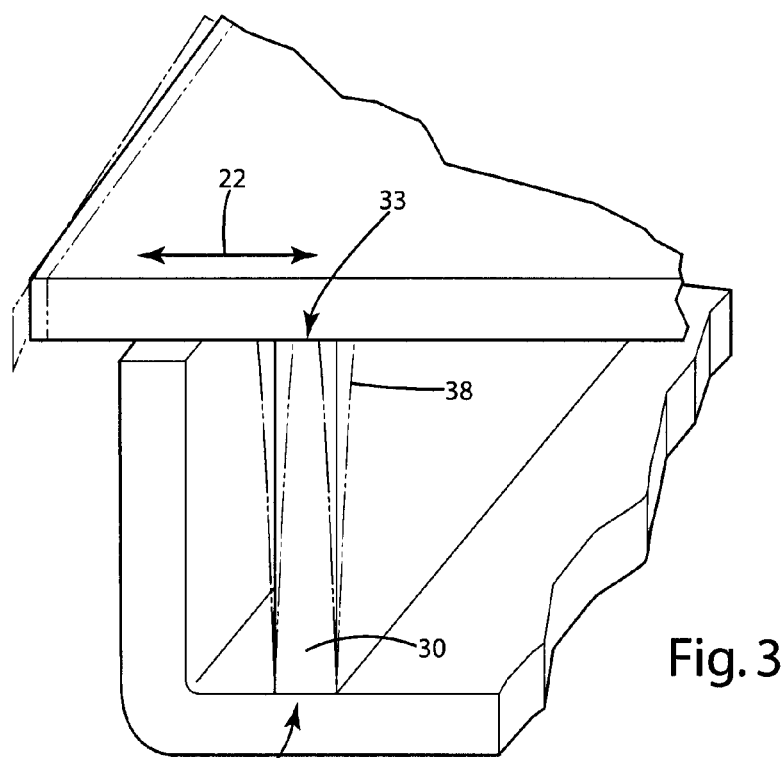
FIG. 3 is a perspective view of a compliant member showing movement in phantom lines.
Figure 4:
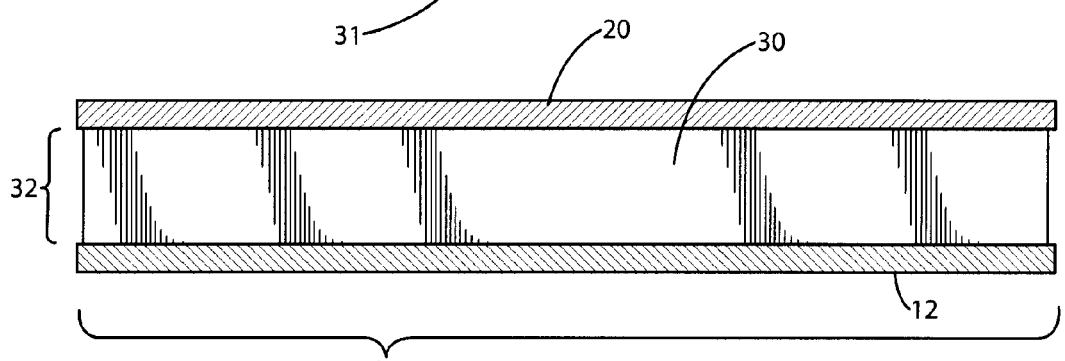
FIG. 4 is a side view of the compliant member showing movement in phantom lines.
Figure 5:
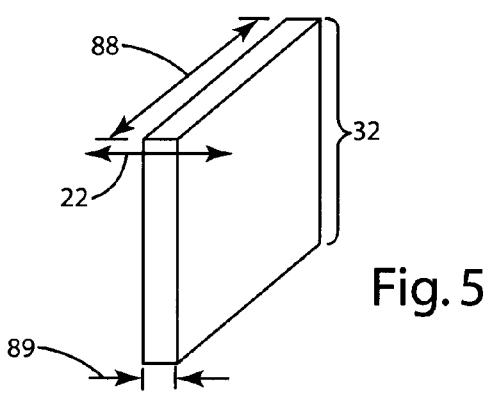
FIG. 5 is an isometric view of a compliant member without the specific mounting on the ends to mount with the panel and base.

In the present invention, the interface surface 20 is generally coupled to the base 12 with only a compliant member 30 or multiple compliant members 30. The number of compliant members 30 used may vary depending on the size and design requirements of the interface surface 20. As illustrated in FIG. 2, the interface surface 20 is shown being coupled to the rigid base 12 with two compliant members 30 which of course could be reduced to a single compliant member or include additional compliant members. It is important that the compliant members 30 are arranged such that they allow uniform movement in a single axis while constraining motion along substantially different axes. For example, if the compliant members 30 are not aligned with each other or substantially parallel to allow movement along the same axis and substantially perpendicular to the longitudinal axis of the compliant members, no movement of the interface surface 20 would be accomplished by the haptic driver 50. The compliant member 30 may be coupled to the base 12 and the interface surface 20 by any desirable method including adhesive, mechanical fixtures, or other devices. The compliant member 30 is better illustrated in FIGS. 3 and 4 which also show motion of the compliant member 30 along the direction of haptic feedback by arrow 22. The motion of the compliant member 30 to allow directional movement along a single axis is illustrated with the phantom lines showing the flexing of the compliant member. The compliant members 30 generally are designed significantly thinner in the direction of motion as compared to the direction orthogonal to intended motion. This allows the compliant member to easily provide direction in a single axis while constraining movement in other axes cheaply and efficiently, the use of a compliant member also is easy to assemble and eliminates a variety of ports form traditional haptic systems.

The compliant member is generally formed from a material such as steel or plastic but any material may work so long as it constrains the movement of the interface surface 20 as discussed above yet allowing for the proper compliance in the direction of desired movement of the interface surface 20. The specific dimensions of the compliant member should be calculated based on the specific needs of the system being designed. But in the exemplary embodiment, the compliant member is formed from steel and generally has a cross-sectional thickness 89 of at least 2 times smaller than the longitudinal extent 88. More specifically, the compliant member 30 generally has a large longitudinal extent 88 as compared to the lateral extent 89 such that the longitudinal extent 88 is typically at least 10 times longer than the lateral extent 89. The height of the device 32 of the complaint member 30 may further be taken into account to allow the desired type of motion. More specifically, as the height 32 increases, the first end 31 rigidly affixed to the base 12 and the second end 33 affixed to the interface surface 20 may move relative to each other when driven by the haptic feedback driver 50 in increasing distances. This flexing motion even though in small increments allows the interface surface to provide the desired haptic feedback motion. The motion is illustrated as phantom lines 38 in FIG. 3.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A haptic system comprising:
    an interface surface;
    a base coupled to said interface surface with a compliant member and wherein said compliant member is capable of flexing in a single axis of travel and constrains movement of said interface surface to substantially said single axis of travel;
    a haptic driver interconnected with said interface surface and said base and wherein said haptic driver is configured to move said interface surface relative to said base along said single axis of travel.

2. The haptic system of claim 1 wherein said haptic driver includes a shaft aligned with said single axis of travel.

3. The haptic system of claim 1 wherein said single axis of travel is a range of ±5°.

4. The haptic system of claim 1 wherein said interface surface is capable of moving 0.05 to 0.50 mm relative to said base.

5. The haptic system of claim 1 wherein said compliant member includes a lateral extent and a longitudinal extent and wherein said longitudinal extent is generally 10 times greater than said lateral extent.

6. The haptic system of claim 5 wherein said compliant member includes a height that is at least 2 times greater than said lateral extent.

7. The haptic system of claim 6 wherein said longitudinal extent is at least 5 times longer than said height.

8. The haptic system of claim 1 wherein said compliant member includes a lower surface and a upper surface extending along a longitudinal extent of said compliant member and wherein said upper surface is capable of being offset relative to said lower surface at least 25 mm.

9. The haptic system of claim 1 wherein said compliant member is flexible along said lateral extent and resistant to flex along said longitudinal extent.

10. The haptic system of claim 1 wherein said compliant member is flexible along said lateral extent and substantially resistant to flex along said height.

11. The haptic system of claim 10 wherein said compliant member is substantially resistant to compression under normal forces applied to said interface surface.

12. The haptic system of claim 1 further including a second compliant member which is substantially parallel along its longitudinal extent to said compliant member.

13. A haptic system comprising:
an interface surface;
a base;
a compliant member coupling said interface surface to said base and wherein said compliant member has a longitudinal extent, a lateral extent and a height and wherein said compliant member is flexible along said lateral extent and resistant to flex along said longitudinal extent;
a haptic driver interconnected with said interface surface and said base and wherein said haptic driver is configured to move said interface surface relative to said base.

14. The haptic system of claim 13 wherein said compliant member constrains movement to a single axis having a range of ±5°.

15. The haptic system of claim 13 wherein said compliant member limits movement of the base relative to the interface surface to a single degree of freedom.

16. The haptic system of claim 13 wherein said longitudinal extent is generally 10 times greater than said lateral extent.

17. The haptic system of claim 13 wherein said height is at least 2 times greater than said lateral extent.

18. The haptic system of claim 13 wherein said compliant member is flexible along said lateral extent and substantially resistant to flex along said height.

19. The haptic system of claim 13 further including a second compliant member which is substantially parallel along its longitudinal extent to said longitudinal extent of said compliant member.

20. A haptic system comprising:
an interface surface;
a base coupled to said interface surface;
a compliant member extending between said base and said interface surface and wherein said compliant member allows directional movement along a single axis of travel while constraining movement in other axes;
a haptic driver interconnected with said interface surface and said base and wherein said haptic driver is configured to move said interface surface relative to said base.

* * * * *